United States Patent
Ohlsson et al.

(10) Patent No.: US 12,507,154 B2
(45) Date of Patent: Dec. 23, 2025

(54) APPARATUS AND METHOD IN A RADIO COMMUNICATIONS NETWORK

(71) Applicant: Telefonaktiebolaget LM Ericsson (publ), Stockholm (SE)

(72) Inventors: Oscar Ohlsson, Bromma (SE); Olof Liberg, Enskede (SE); Andreas Höglund, Solna (SE); Stefan Wänstedt, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 617 days.

(21) Appl. No.: 17/802,179

(22) PCT Filed: Mar. 17, 2021

(86) PCT No.: PCT/SE2021/050235
§ 371 (c)(1),
(2) Date: Aug. 25, 2022

(87) PCT Pub. No.: WO2021/201741
PCT Pub. Date: Oct. 7, 2021

(65) Prior Publication Data
US 2023/0362787 A1    Nov. 9, 2023

Related U.S. Application Data

(60) Provisional application No. 63/003,312, filed on Apr. 1, 2020.

(51) Int. Cl.
*H04W 48/02* (2009.01)
*H04W 48/18* (2009.01)

(52) U.S. Cl.
CPC ........... *H04W 48/02* (2013.01); *H04W 48/18* (2013.01)

(58) Field of Classification Search
CPC .............................. H04W 48/02; H04W 48/18
See application file for complete search history.

(56) References Cited

U.S. PATENT DOCUMENTS 9,439,116 B2    9/2016  Zhang et al.
9,736,725 B2    8/2017  Kuo et al.
(Continued)

FOREIGN PATENT DOCUMENTS

CO    20180005810 A2    6/2018

OTHER PUBLICATIONS

International Search Report and Written Opinion of the International Searching Authority, PCT/SE2021/050235, mailed Jun. 1, 2021, 15 pages.
(Continued)

*Primary Examiner* — Yu-Wen Chang
(74) *Attorney, Agent, or Firm* — Sage Patent Group

(57) ABSTRACT

A method performed by an apparatus for handling a User Equipment access to a radio communications network is provided. The UE is using reduced capabilities. The reduced capabilities relate to reduced capabilities for communication in the radio communications network. The apparatus obtains information about a subscriber profile of the UE. When the UE accesses to the radio communications network using reduced capabilities, the apparatus determines whether or not the UE is authorized to access the radio communications network by using reduced capabilities, based on the obtained information about the subscriber profile of the UE.

10 Claims, 12 Drawing Sheets

(56) References Cited

U.S. PATENT DOCUMENTS

| | | | |
|---|---|---|---|
| 2012/0076118 A1 | 3/2012 | Montemurro et al. | |
| 2014/0099928 A1 | 4/2014 | Caldwell et al. | |
| 2014/0235258 A1 | 8/2014 | Chen et al. | |
| 2015/0327142 A1 | 11/2015 | Tarradell et al. | |
| 2016/0234707 A1 | 8/2016 | Kazmi et al. | |
| 2018/0219652 A1 | 8/2018 | Chen et al. | |
| 2019/0141695 A1 | 5/2019 | Babaei et al. | |
| 2020/0053531 A1 | 2/2020 | Myhre et al. | |
| 2021/0227451 A1* | 7/2021 | Babaei | H04W 76/27 |
| 2022/0353807 A1* | 11/2022 | He | H04W 48/16 |
| 2022/0377532 A1* | 11/2022 | He | H04W 48/18 |
| 2022/0408348 A1* | 12/2022 | Li | H04W 48/16 |
| 2023/0070068 A1* | 3/2023 | Hu | H04W 72/51 |
| 2024/0031909 A1* | 1/2024 | Yue | H04W 48/08 |

OTHER PUBLICATIONS

"Further discussion on RF impact of UE Category 0", R4-143115, 3GPP TSG-RAN WG4 Meeting #71, May 18, 2014, (XP050797877), 4 pages.

"Single Rx antenna capability and TBS limitation for unicast transmission", R2-142541, 3GPP TSG-RAN WG2 #86, May 18, 2014, (XP050793648), 6 Pages.

"Constraint on usage of RedCap functions", R2-20679, 3GPP TSG-RAN WG2 #111e, Aug. 7, 2020, (XP051911827), 3 Pages.

"Report of [Post111-e][913][REDCAP] Definition and constraining o reduced capabilities (Intel)", R2-2009004, 3GPP TSG-RAN WG2 Meeting #112 electronic, Oct. 23, 2020, (XP051942049), 30 Pages.

"New SID on Support of Reduced Capability NR Devices", RP-193238, 3GPP TSG RAN Meeting #86, Dec. 9-12, 2019, 5 Pages.

Office Action, Colombian Patent Application No. NC2022/0008986, mailed Oct. 11, 2024, 8 pages.

Office Action, Chinese Patent Application No. 202180023783.3, mailed Dec. 27, 2024, 7 pages.

"Open aspects in low complexity UE specification ," Intel Corporation, 3GPP TSG RAN WG2 Meeting #86, R2-142054, Seoul, South Korea, 19-May 19-23, 23, 2014, 5 pages.

Second Columbian Office Action; Columbian Patent Application No. NC2022/0008978 mailed Jul. 14, 2025; 30 pages (including English translation).

* cited by examiner

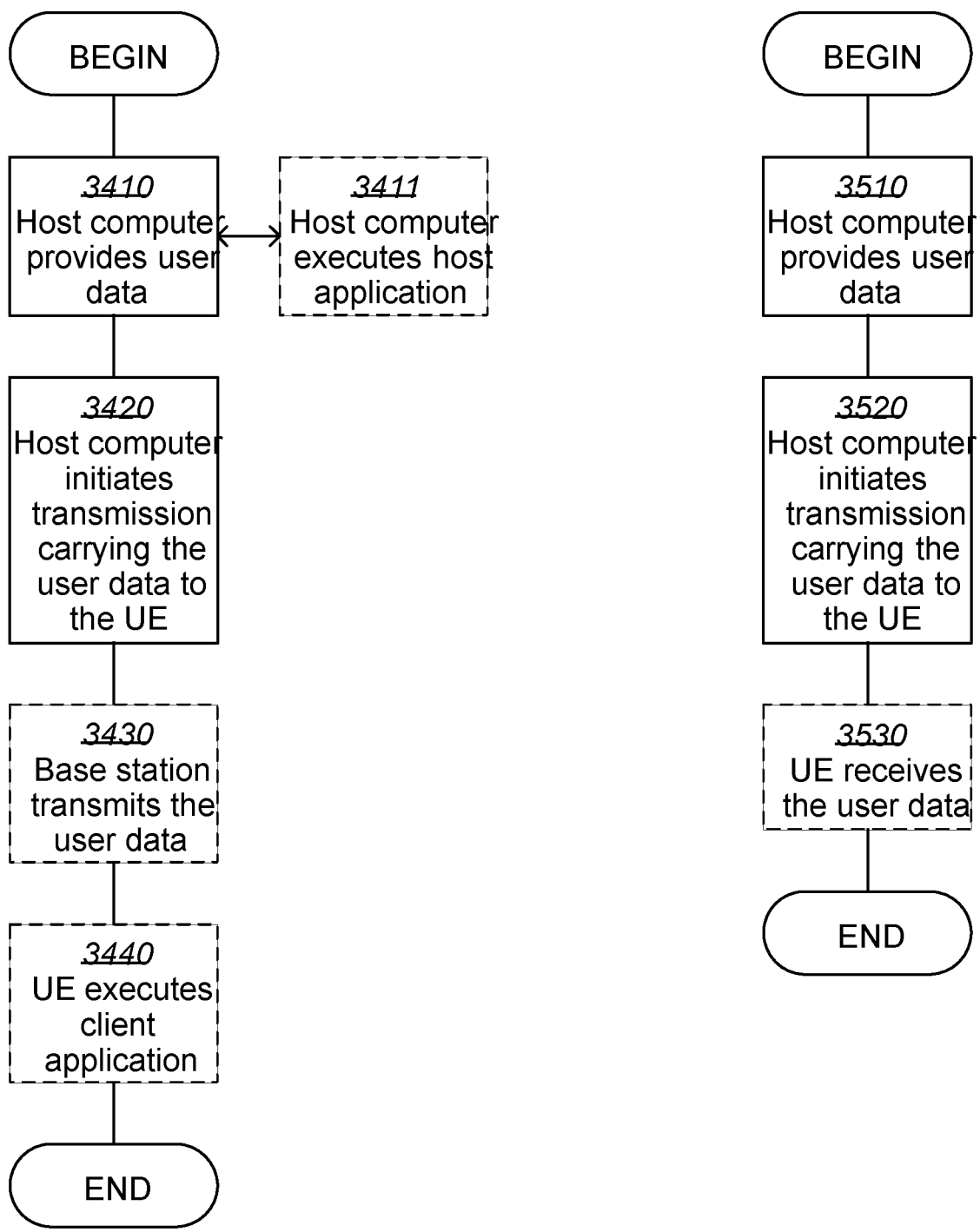

APPARATUS AND METHOD IN A RADIO COMMUNICATIONS NETWORK

This application is a 35 U.S.C. § 371 national stage application of PCT International Application No. PCT/US2021/050235 filed on Mar. 17, 2021, which in turn claims domestic priority to U.S. Provisional Patent Application No. 63/003,312, filed on Apr. 1, 2020, the disclosures and content of which are incorporated by reference herein in their entirety.

TECHNICAL FIELD

Embodiments herein relate to an apparatus and methods therein. In some aspects, they relate to handling a User Equipment, UE, access to a radio communications network.

BACKGROUND

In a typical wireless communication network, wireless devices, also known as wireless communication devices, mobile stations, stations (STA) and/or User Equipment (UE), communicate via a Local Area Network such as a W-Fi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

As mentioned above, 5G is the fifth generation of cellular technology and was introduced in Release 15 of the 3GPP standard. It is designed to increase speed, reduce latency, and improve flexibility of wireless services. A 5G system (5GS) comprises both a New Radio Access Network (NG-RAN) which makes use of a new air interface called New Radio (NR), and a new Core Network (5GC).

In 3GPP Release 17, a new UE type is introduced for NR. The new type of UE is a UE with reduced capabilities for applications with low to medium performance requirements, such as wearables and industrial sensors.

Overview of the NG-RAN Architecture

Similar to E-UTRAN in 4G, the NG-RAN uses a flat architecture and comprises base stations, called gNBs, which are interconnected with each other by means of an Xn-interface. The gNBs are also connected by means of the NG interface to the 5GC, more specifically to the Access and Mobility Management Function (AMF) by the NG-C interface and to the User Plane Function (UPF) by means of the NG-U interface. The gNB in turn provides the radio access to the UE; the coverage of the gNB practically forming "cells" of radio coverage. The radio access technology, referred to as New Radio, (NR) is Orthogonal Frequency Division Multiplexing (OFDM) based like in LTE and offers high data transfer speeds and low latency. Note that NR is sometimes used to refer to the whole 5G system although it is strictly speaking only the 5G radio access technology.

It is expected that NR will be rolled out gradually on top of the legacy LTE network starting in areas where high data traffic is expected. This means that NR coverage will be limited in the beginning and users must move between NR and LTE as they go in and out of NR coverage. To support fast mobility between NR and LTE and avoid change of core network, LTE eNBs will also connect to the 5GC and support the Xn interface. An eNB connected to 5GC is called a next generation eNB (ng-eNB) and is considered part of the NG-RAN. See FIG. 1 depicting an NG-RAN architecture. LTE connected to 5GC is described for completeness and will not be considered further in this document.

NR RedCap

The initial release of 5G in Release 15 is optimized for enhanced Mobile Broadband (eMBB) and Ultra-Reliable and Low Latency Communication (URLLC). These services require very high data rates and/or low latency, and therefore puts high requirements on a UE. To enable 5G to be used for other services with more relaxed performance requirements, such as wireless sensors or wearables, a new low cost UE type is introduced in Release 17 see 3GPP RP-193238, "New SID on support of reduced capability NR devices. This low cost UE has reduced capabilities compared to the Release 15 device, for instance:

Reduced device bandwidth, e.g. 10 MHz instead of 100 MHz in FR1

Reduced number of antennas, e.g. 1 antenna instead of 2 antennas in FR1

Half duplex FDD instead of full duplex FDD

The new UE type is sometimes referred to as an NR RedCap UE.

If low complexity UEs with reduced capabilities are used for applications which they are not intended for it may not be possible to fulfil service requirements and user expectations of the application, for example for eMBB or URLLC applications. Although the problem is caused by the low-complexity UE, it may be perceived by other UEs in the network as a network error and may thus damage the operator's reputation. If low complexity UEs become widespread this may also ruin the public perception of 5G as a superior technology.

SUMMARY

An object of embodiments herein is to improve the performance of a radio communications network wherein UEs using reduced capabilities are operating.

According to an aspect of embodiments herein, the object is achieved by a method performed by an apparatus for handling a User Equipment, UE, access to a radio communications network. The UE is using reduced capabilities. The reduced capabilities relate to reduced capabilities for communication in the radio communications network. The apparatus obtains information about a subscriber profile of the UE. When the UE accesses to the radio communications network using reduced capabilities, the apparatus determines whether or not the UE is authorized to access the radio communications network by using reduced capabilities, based on the obtained information about the subscriber profile of the UE.

According to another aspect of embodiments herein, the object is achieved by an apparatus in a radio communications network configured to handle a User Equipment, UE, access to a radio communications network. The UE is configured to use reduced capabilities. The reduced capabilities are adapted to relate to reduced capabilities for communication in the radio communications network. The apparatus is further configured to:

Obtain information about a subscriber profile of the UE, and when the UE accesses to the radio communications network using reduced capabilities, determine whether or not the UE is authorized to access the radio communications network by using reduced capabilities, based on the obtained information about the subscriber profile of the UE.

It is furthermore provided herein a computer program product comprising instructions, which, when executed on at least one processor, cause the at least one processor to carry out any of the methods above, as performed by the apparatus. It is additionally provided herein a computer-readable storage medium, having stored there on a computer program product comprising instructions which, when executed on at least one processor, cause the at least one processor to carry out the method according to any of the methods above, as performed by the apparatus.

E.g., the UE using reduced capabilities has a subscription at an operator and therefore has a subscriber profile at the operator.

By means of the subscriber profile of the UE, it is possible to control network access of a UE using reduced capabilities. The access is controlled such that a UE that is authorized to access the radio communications network gains access to the radio communications network, and such that a UE that is not authorized to access the radio communications network may be rejected, such as denied access to the radio communications network.

In this way the UEs that are not authorized will not access, and therefore will not cause any problems within the radio communications network. Thus, the performance of the radio communication network, e.g. in terms of capacity, latency and spectral efficiency is improved for any UEs such as e.g. regular UEs.

BRIEF DESCRIPTION OF THE DRAWINGS

Examples of embodiments herein are described in more detail with reference to attached drawings in which:

FIGS. 11-14 are flowcharts illustrating methods implemented in a communication system including a host computer, a base station and a user equipment.

DETAILED DESCRIPTION

Figure 1:
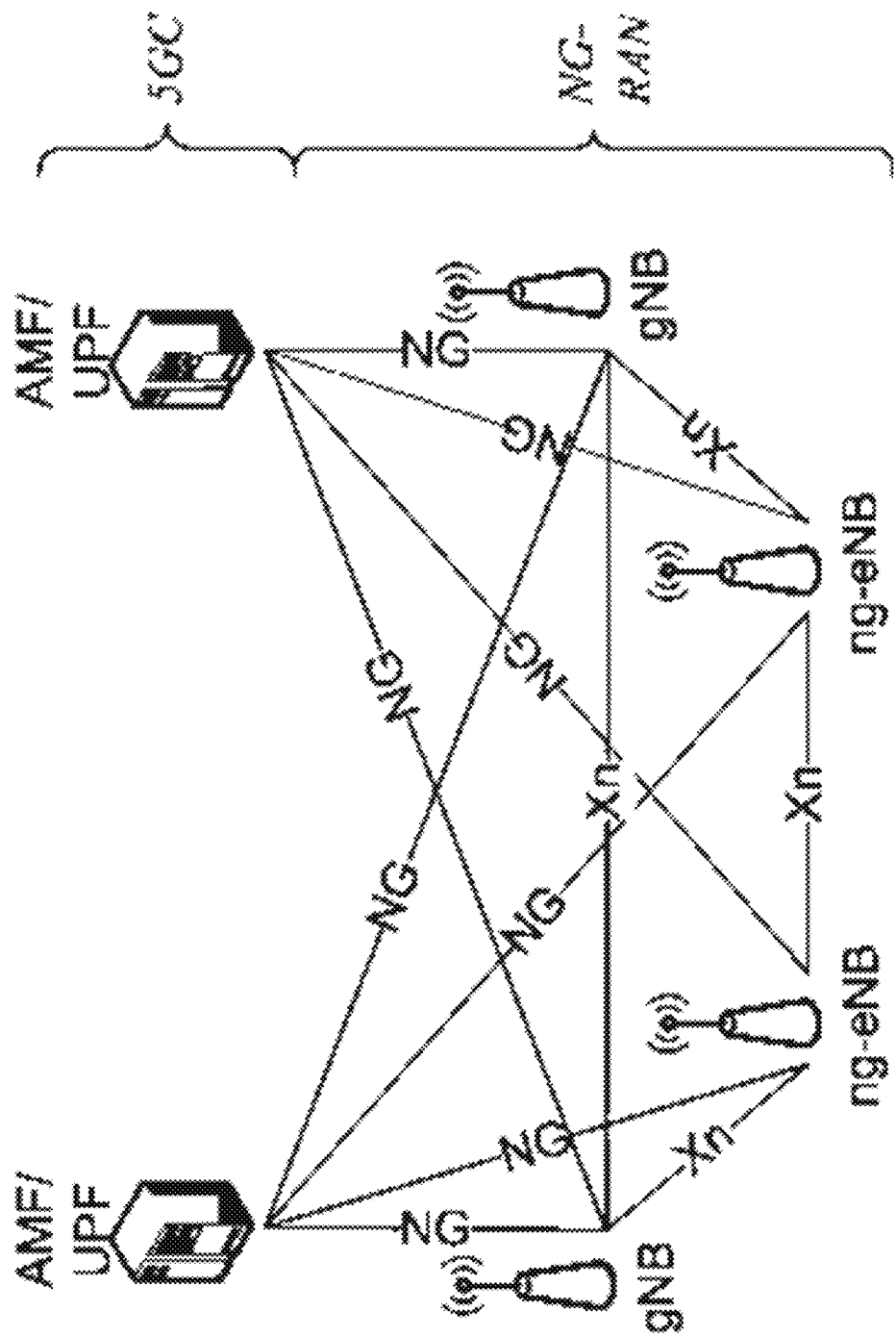
FIG. 1 is a schematic block diagrams illustrating prior art.

As a part of developing embodiments herein the inventors identified a problem which first will be discussed.

As mentioned above, in 3GPP Release 17, a new UE type is introduced for NR with reduced capabilities for applications with low to medium performance requirements, such as wearables and industrial sensors.

In addition to the perception problem, the use of low complexity UEs may also impact system capacity since fewer UEs can be served by the network when the UEs have reduced capabilities. For example, even if the carrier bandwidth is 100 MHz the network may only be possible to utilize 10 MHz due to the limited UE bandwidth. If all UEs are confined to the same 10 MHz, there will be roughly a 90 percent drop in system capacity compared to when all UEs support the full carrier bandwidth.

There is thus a need for e.g. an operator to be able to restrict the use of low complexity UE in its network depending on the service used by the subscriber.

An object of embodiments herein is thus to improve the performance of a radio communications network wherein UEs using reduced capabilities are operating.

Embodiments herein may relate to how an operator may restrict the use of such reduced capabilities using UEs such as e.g. low cost UEs in a radio communications network, which is a concern and therefore captured in the most recent version of a study item description of 3GPP RP-193238, "New SID on support of reduced capability NR devices, by the following objectives:

Study standardization framework and principles for how to define and constrain such reduced capabilities—considering definition of a limited set of one or more device types and considering how to ensure those device types are only used for the intended use cases [RAN2, RAN1].

Study functionality that will allow devices with reduced capabilities to be explicitly identifiable to networks and network operators, and allow operators to restrict their access, if desired [RAN2, RAN1].

Methods capable of restricting the use of low complexity UEs are provided in embodiments herein. According to embodiments herein, when a UE connects to the network using reduced capabilities, an authorization check is made to verify that the UE is allowed to access the network using reduced capabilities. The authorization check may either be made by the CN, the RAN, or the UE and is e.g. based on the information in the subscriber profile.

An advantage of embodiments herein is that they enable the operator to restrict the use of low complexity UEs, such as a UE 120, with reduced capabilities to the applications which they are intended for, such as industrial sensors or wearables. This is possible by using the UEs, such as a UE 120, subscriber profile informing about the applications which they are intended for.

For the operator to control network access such as accesses to the radio communications network right, is to pre-configure UEs, such as the UE 120, with authorization information defining if access for a certain UE type, such as the UE 120 type, is permitted in a certain network according to its subscriber profile. This means that the operator may pre-configure the UE 120 with authorization information defining if access for a certain UE type, such as the UE 120 type, is permitted in the radio communications network 100 according to its subscriber profile.

Figure 2:
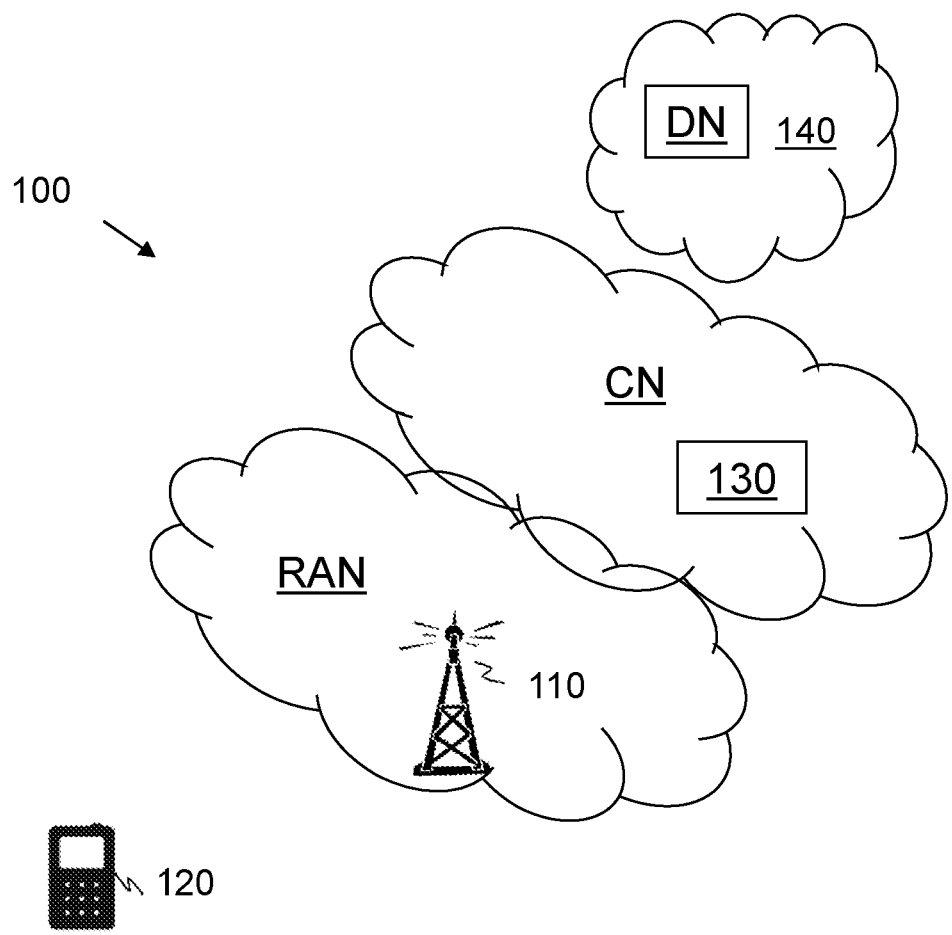
FIG. 2 is a schematic block diagram illustrating embodiments of a radio communications network.

FIG. 2 is a schematic overview depicting a radio communications network 100 wherein embodiments herein may be implemented. The radio communications network 100 comprises one or more RANs and one or more CNs. The radio communications network 100 may use 5G NR but may further use a number of other different technologies, such as, (LTE), LTE-Advanced, Wideband Code Division Multiple Access (WCDMA), Global System for Mobile communications/enhanced Data rate for GSM Evolution (GSM/EDGE), or Ultra Mobile Broadband (UMB), just to mention a few possible implementations.

Radio Access Network nodes such as a RAN node 110 operate in the radio communications network 100. The RAN node 110 e.g. provides access to the radio communications network 100 for UEs served by the RAN node 110. The RAN node 110 e.g. provides a number of cells. The RAN node 110 may be a transmission and reception point e.g. a radio access network node such as a base station, e.g. a radio base station such as a NodeB, an evolved Node B (eNB, eNode B), an NR Node B (gNB), a base transceiver station, a radio remote unit, an Access Point Base Station, a base station router, a transmission arrangement of a radio base station, a stand-alone access point, a Wireless Local Area Network (WLAN) access point, an Access Point Station (AP STA), an access controller, a UE acting as an access point or a peer in a Device to Device (D2D) communication, or any other network unit capable of communicating with a UE served by the RAN node 110 depending e.g. on the radio access technology and terminology used.

User Equipments operate in the radio communications network 100, such as e.g. a UE 120. The UE 120 may e.g. be an NR device, a mobile station, a wireless terminal, an NB-Internet of Things (IoT) device, an eMTC device, a low complexity UE, an NR RedCap device, a CAT-M device, a WiFi device, an LTE device and an a non-access point (non-AP) STA, a STA, that communicates via a base station such as e.g. the network node 110, one or more Access Networks (AN), e.g. RAN, to one or more core networks (CN). It should be understood by the skilled in the art that the UE relates to a non-limiting term which means any UE, terminal, wireless communication terminal, user equipment, (D2D) terminal, or node e.g. smart phone, laptop, mobile phone, sensor, relay, mobile tablets or even a small base station communicating within a cell. The UE 120 is capable of using reduced capabilities for communication in the radio communications network 100.

The UE 120 has a subscription at an operator. The subscription at the operator may e.g. be a data subscription and/or a voice subscription. The UE 120 therefore has a subscriber profile at the operator. A subscriber profile of the UE 120 when used herein means a collection of subscriber policy control data e.g. comprising subscribed services, subscriber level, allowed Public Land Mobile Network (PLMN) Identity (ID)s, allowed RATs, allowed network slices, QoS profile etc.

The subscriber profile of the UE 120 may be comprised in a centralized user database of the operator like a Unified Data Management (UDM) in the 5G CN. A subset of the subscriber profile may also be stored in the subscriber's Universal Subscriber Identity Module (USIM). It is also possible that subscriber policy information that is common many to many subscribers to be stored in separately in e.g. another CN node like the AMF or in the RAN in RAN nodes such as the RAN node 110, e.g. gNBs.

CN nodes such as a CN node 130 operates in the CN network of the radio communications network 100. The CN node 130 may e.g. comprise any one or more out of an AMF, an SMF, an UDM, an UPF and any suitable function. The CN node 130 may be any one or more out of an AMF node, SMF node, UDM or an UPF node or any other suitable node.

Methods herein may in one aspect be performed by an apparatus sometimes referred to as the apparatus 110, 120, 130, which apparatus may be any one or more out of the UE 120, the RAN node 110, and the CN node 130. As an alternative, a Distributed Node (DN) and functionality, e.g. comprised in a cloud 140 as shown in FIG. 2, may be used for performing or partly performing the methods.

Embodiments herein enable a restriction of use of reduced capability UEs to certain services based on a subscriber profile of the UE 120 when the UE 120 connects to the radio communications network 100. The method is performed by the apparatus 110, 120, 130 which may be any one or more out of the RAN node 110, the UE 120 and the CN node 130. This means that the method may be performed in more than one of apparatuses when the UE 120 connects to the radio communications network 100.

Figure 3:
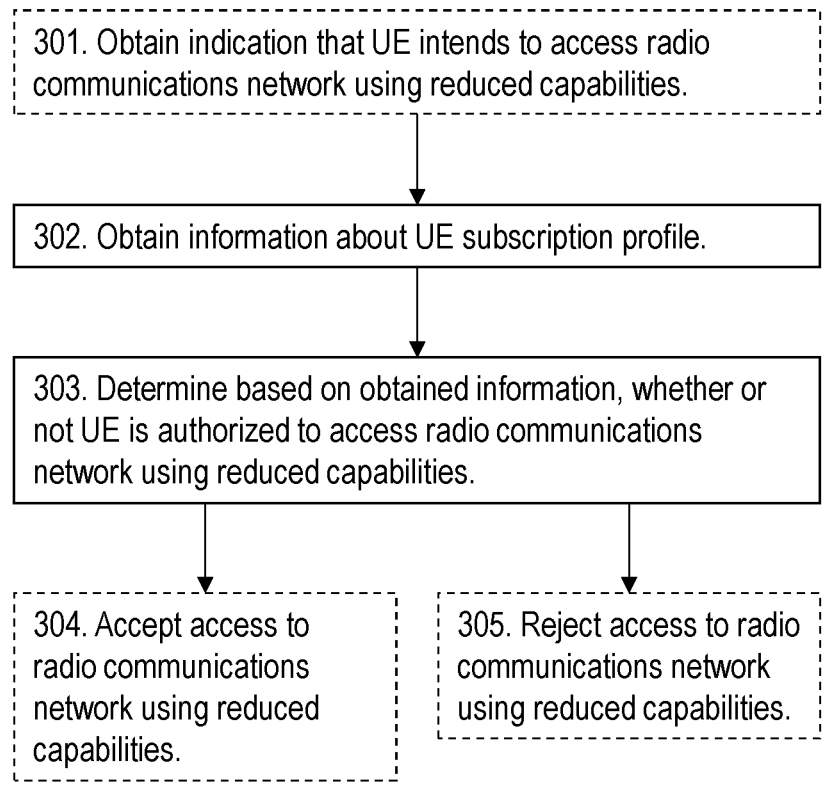
FIG. 3 is a flowchart depicting embodiments of a method in an apparatus.

FIG. 3 shows an example method performed by the apparatus 110, 120, 130 comprising any one or more out of the UE 120, the RAN node 110 and CN node 130, in the radio communications network 100. The method is for handling a UE 120 access to the radio communications network 100. The UE 120 accessing to the radio communications network 100 when used herein may e.g. mean that the UE 120 attempts to camp on a cell belonging to the radio communications network 100, establish a connection with the radio communications network 100, register onto the radio communications network 100, or in general make use of resources belonging to the radio communications network 100. The UE 120 is using reduced capabilities, which reduced capabilities relate to reduced capabilities for communication in the radio communications network 100. The reduced capabilities may e.g. comprise one or more out of:

Reduced UE bandwidth.
Reduced number of UE Receiving, RX, and/or Transmitting, TX, antennas.
Half duplex Frequency Division Duplex, FDD.
Relaxed UE processing time.
Relaxed UE processing capability.

The method comprises any one or more out of the actions below:

Action 301

The apparatus 110, 120, 130 may in some embodiments obtain an indication that the UE 120 intend to access the radio communications network 100 using reduced capabilities. The apparatus 110, 120, 130 may obtain the indication by receiving it from the UE 120 or a node. Or the apparatus 110, 120, 130 may obtain the indication by being preconfigured with it. This action will be described more in detail below.

Action 302

The UE 120 is a UE that uses reduced capabilities, and therefore it is needed for the apparatus to check if the UE 120 is authorized to access the radio communications network 100 with the reduced capabilities. This is needed since, if the UE 120 should access the radio communications network 100 without being authorized, it may cause problems in the radio communications network 100, as said above.

As mentioned above, the UE 120 has a subscription at an operator and therefore has a subscriber profile at the operator. For the operator to control the right to access the radio communications network 100 is to pre-configure UEs, such as the UE 120, with authorization information defining if access for a certain UE type, such as the UE 120 type, is permitted in a certain network according to its subscriber profile. The pre-configured information may e.g. be stored in the UE 120, or in the USIM of the UE 120. It may be defined per network, identified by a PLMN ID, or per access technology, or per a combination of the two. The operator controls and sets the subscriber profile of the UE 120.

The apparatus 110, 120, 130 obtains information about the subscriber profile of the UE 120. This information will be used as a basis to determine whether or not the UE 120 is authorized to access the radio communications network 100 by using reduced capabilities, when the UE 120 accesses to the radio communications network 100.

The information about the subscriber profile may be obtained e.g. by checking the subscriber profile of the UE 120. The subscriber profile may be retrieved from a Unified Data Management (UDM), e.g. comprised in the 5G CN.

In some embodiments, the UE identity will be used by the RAN node 110 to retrieve the UE context from the CN node 130, which includes the UE capabilities and subscriber profile. It should be noted that that it is possible that the CN node 130 only sends a subset of the subscriber profile to the RAN, such as the RAN node 110, or sends configuration data derived from the subscriber profile.

In some embodiments wherein the apparatus is represented by UE 120, the UE 120 checks SI if it is authorized to access the radio communications network 100 with reduced capabilities.

The information about the subscriber profile of the UE 120 may comprise information that the UE 120 is authorized to use reduced capabilities when accessing to one or more specific parts of the radio communications network 100. The one or more specific parts of the radio communications network 100 may e.g. comprise a dedicated network, a network slice, a geographical region of the radio communications network 100, a or a frequency of the radio communications network 100.

Further, the information about a subscriber profile of the UE 120 may comprise information that the UE 120 is authorized to use reduced capabilities when accessing the radio communications network 100 using one or more specific policies. This e.g. means that if the UE 120 accessing the radio communications network 100 uses a specific policy, e.g. Quality of Service (QoS) profile or Radio Resource Management (RRM). policy, it will also be allowed to use reduced capabilities.

The one or more specific policies may e.g. comprise a QoS profile, or RRM policy being configured for a particular service.

This action will be described more in detail below.

Action 303

When the UE 120 accesses to the radio communications network 100 using reduced capabilities, the apparatus 110, 120, 130 determines whether or not the UE 120 is authorized to access the radio communications network 100 by using reduced capabilities. The determining is based on the obtained information about the subscriber profile of the UE 120. It should be noted that the wording "when the UE 120 accesses to the radio communications network 100 using reduced capabilities", also covers the wording "when the UE 120 intends to access to the radio communications network 100 using reduced capabilities". This may mean that the apparatus 110, 120, 130 checks the information in the subscriber profile of the UE 120.

As mentioned above, embodiments herein may relate to how an operator may restrict the use of such reduced capabilities using UEs. By means of the obtained information about the subscriber profile of the UE 120, the operator may accept or reject a UE such as the UE 120 using reduced capabilities when it accesses the radio communications network 100.

This action will be described more in detail below.

Action 304

When it is determined that the UE 120 is authorized to access the radio communications network 100 by using reduced capabilities, the apparatus 110, 120, 130 may accept the access the radio communications network 100 by using reduced capabilities. This action will be described more in detail below.

Action 305

When determining that the UE 120 is not authorized to access the radio communications network 100 by using reduced capabilities, the apparatus 110, 120, 130 may reject access to the radio communications network 100 by using reduced capabilities. This action will be described more in detail below.

For the operator to control the right to access the radio communications network 100, it may pre-configure UEs, such as the UE 120, with authorization information that defines if access for a certain UE type is permitted in a certain network according to its subscriber profile.

In this way, the operator can by means of the information in the subscriber profile, e.g. pre-configured in the UE 120 by the operator, control access of UEs such as the UE 120, to the radio communications network 100. This results in that UEs that are not authorized will not access, and therefore will not cause any problems within the radio communications network. Thus, the performance of the radio communications network is improved and not degraded.

The method will now be further explained and exemplified in below embodiments. These below embodiments may be combined with any suitable embodiment as described above.

As mentioned above, the handling the UE 120 access to the radio communications network 100, such as e.g. the authorization of the use of reduced UE capabilities may be performed in either the CN e.g. by the CN node 130, in the RAN e.g. by the RAN node 110, or in the UE 122.

Alternative 1. Authorization check performed in the CN, e.g. by the CN node 130. I.e. the apparatus 110, 120, 130 is represented by CN node 130. Checking authorization when used herein, is also referred to as determining whether or not the UE 120 is authorized to access the radio communications network 100 by using reduced capabilities, is performed in the CN node 130.

Figure 4:
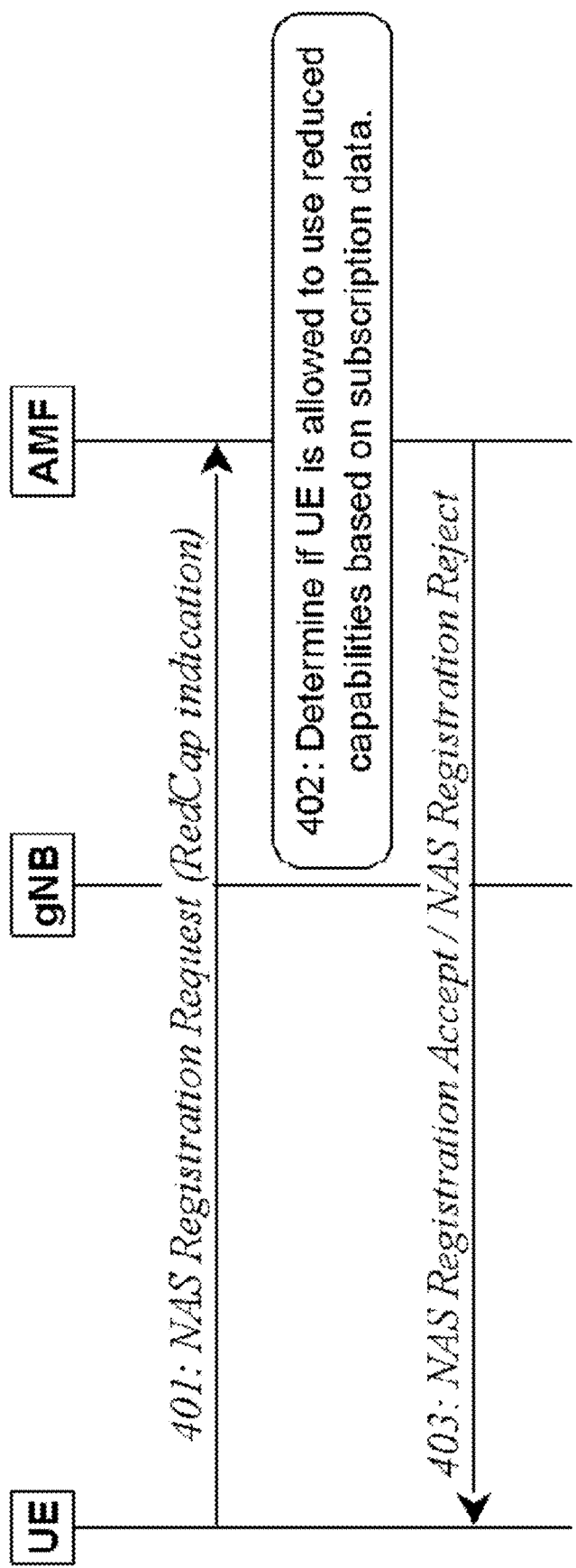
FIG. 4 is a sequence diagram depicting embodiments of a method.

In this alternative the CN, such as the CN node 130, verifies that, also referred to as "determines whether or not", the UE 120 is authorized to use reduced UE capabilities during the network registration. The actions of an example embodiment are illustrated in FIG. 4. FIG. 4 depicts the process where the CN, such as the CN node 130, authorizes the use of reduced capabilities. In the example of FIG. 4 and its corresponding text below, the UE 120 is referred to as UE, the CN node 130 is represented by and referred to as AMF, and the RAN node 110 is referred to as gNB.

Action 401. This action relates to Action 301 how the apparatus 110, 120, 130 such as the CN node e.g. the AMF, obtains an indication that UE 120 intends to access radio communications network using reduced capabilities as described above.

The UE 120 registers onto the radio communications network 100, e.g. by sending a NAS Registration Request to the AMF, such as the CN node 130, in which it indicates that it is using reduced capabilities, also referred to as reduced UE capabilities, and RedCap indication. The use of reduced UE capabilities may be indicated either explicitly or implicitly in the Non-Access Stratum (NAS) Registration Request.

Examples of explicit indications comprises:
A "RedCap" flag, a "RedCap" device type or a "RedCap" specific UE category.
By including (lower) UE capability information of the UE 120, e.g. reduced device bandwidth, half-duplex FDD, or support for 1 receiving antenna.

Examples of implicit indications include:
Requested network (indicated by e.g. the selected/registered PLMN ID)
Requested network slice(s), as indicated by the requested Network Slice Selection Assistance Information (NS-SAI).

Another alternative is that the gNB, such as the RAN node 110, indicates to the AMF, such as the CN node 130, that the UE 120 is using reduced UE capabilities when it forwards the NAS registration request to the AMF, such as the CN node 130, e.g. based on certain lower UE capabilities, such as reduced device bandwidth. Note that FIG. 4 is simplified as it only shows the message exchange between the UE 120 and the CN node 130 represented by the AMF. In reality the NAS registration request is first sent from the UE 120 to the gNB, such as the RAN node 110, in an Radio Resource Control (RRC) connection establishment and/or resume procedure, and then the gNB, such as the RAN node 110, forwards the request to the AMF, such as the CN node 130, in an NG-AP Initial UE message. It is therefore possibly for the gNB, such as the RAN node 110, to include additional information of the UE 120 in the NG-AP Initial UE message.

Yet another alternative is that the AMF, such as the CN node 130, peeks into the stored UE capabilities to determine that the UE 120 is using reduced UE capabilities. From a design perspective this approach is not recommended though since the UE capabilities are intended to be transparent to the AMF.

Yet another alternative is that the AMF, such as the CN node 130 uses a Permanent Equipment Identifier (PEI) to identify the UEs, such as the UE 120, with reduced capabilities. The PEI is sent from the UE 120 to the AMF, such as the CN node 130, during the initial network registration and is stored by the AMF, such as the CN node 130, as part of the UE context. By using e.g., a lookup database the AMF, such as the CN node 130 may determine if the PEI belongs to the UE 120 with reduced capabilities.

Action 402. This action relates to Actions 302 and 303 as described above, how the apparatus 110, 120, 130 such as the CN node e.g. the AMF, obtains information about a subscriber profile of the UE 120, and determines whether or not the UE 120 is authorized to access the radio communications network 100 by using reduced capabilities, based on the obtained information about the subscriber profile of the UE 120. I.e. e.g. by checking the subscriber profile of the UE 120.

The AMF, such as the CN node 130, checks, also referred to as determines, whether the UE 120 is authorized to use reduced capabilities based on subscriber profile. The subscriber profile may be retrieved from a Unified Data Management (UDM), e.g. comprised in the 5G CN. The check may e.g. be based on an explicit indication "RedCap allowed" in the subscriber profile or it may be done implicitly based on e.g., the list of allowed networks or allowed network slices. In the latter case it is assumed that a dedicated network or network slice in the radio communications network 100 has been configured for a particular service, and UEs e.g. the UE 120 which are allowed to connect to this network or network slice are also allowed to use reduced capabilities.

Action 403. This action relates to Actions 304 and 305 as described above, how the apparatus 110, 120, 130 such as the CN node e.g. the AMF, Accepts and/or rejects access to radio communications network using reduced capabilities.

If the authorization is successful the AMF, such as the CN node 130, accepts the registration request and responds to the UE 120 with NAS Registration Accept. Otherwise, if the authorization fails, the AMF, such as the CN node 130, may reject the registration request by sending a NAS Registration Reject to the UE 120 with an appropriate cause value, e.g. "PLMN not allowed", "TA not allowed" or "RedCap not allowed". Alternatively, the AMF may accept the registration request even if the authorization check fails but indicate to the UE that it must disable the reduced UE capabilities. This approach may be useful if the reduced capabilities may be disabled and/or enabled by the UE. This may for example be the case if the UE has full capabilities but prefers to operate with reduced capabilities to e.g. save power. Yet another alternative is that the AMF accepts the registration but removes those network slices for which reduced capabilities are not allowed, e.g. an MBB or URLLC slice.

Instead of authorizing the UE 120 at network registration, the AMF, such as the CN node 130, may also authorize the UE 120 at an Protocol Data Unit (PDU) session establishment or an PDU session modification, i.e. when the UE 120 requests or modifies the data connectivity for a certain service. During PDU session establishment/modification the UE 120 may indicate the associated network slice, identified by an S-NSSAI, and the gateway, identified by the Data Network Name (DNN). This may be used for the authorization, i.e. only the UEs such as e.g. the UE 120 which are allowed to connect to certain network slice or gateway are allowed to use reduced capabilities.

One special case is when the UE 120 performs emergency registration or establishes an emergency PDU session in order to make emergency calls. In this case the AMF, such as the CN node 130, may choose to allow a UE, such as the UE 120, with reduced capabilities to proceed with the registration and/or PDU session establishment even if the UE 120 is normally not allowed to use reduced capabilities.

Note that with CN authorization the configuration may be UE specific, that is even though UE 120 or the gNB, such as the RAN node 110, indicates that the UE 120 is of lower UE capability, it is up to CN, such as the CN node 130, to decide if the UE 120 should be authorized to access the network on a per UE basis, i.e. up to CN implementation. Further, in such a CN, such as the CN node 130, implementation the UE would typically be authorized either in the entire network, a PLMN, or a certain slice in the network, but without distinction on cell level.

Alternative 2: Authorization check performed in the RAN such as in the RAN node 110. I.e. the apparatus 110, 120, 130 is represented by the RAN node 110.

In this alternative, the RAN node 110 verifies that, also referred to as "determines whether or not", the UE 120 is authorized to use reduced UE capabilities at RRC connection setup.

Figure 5:
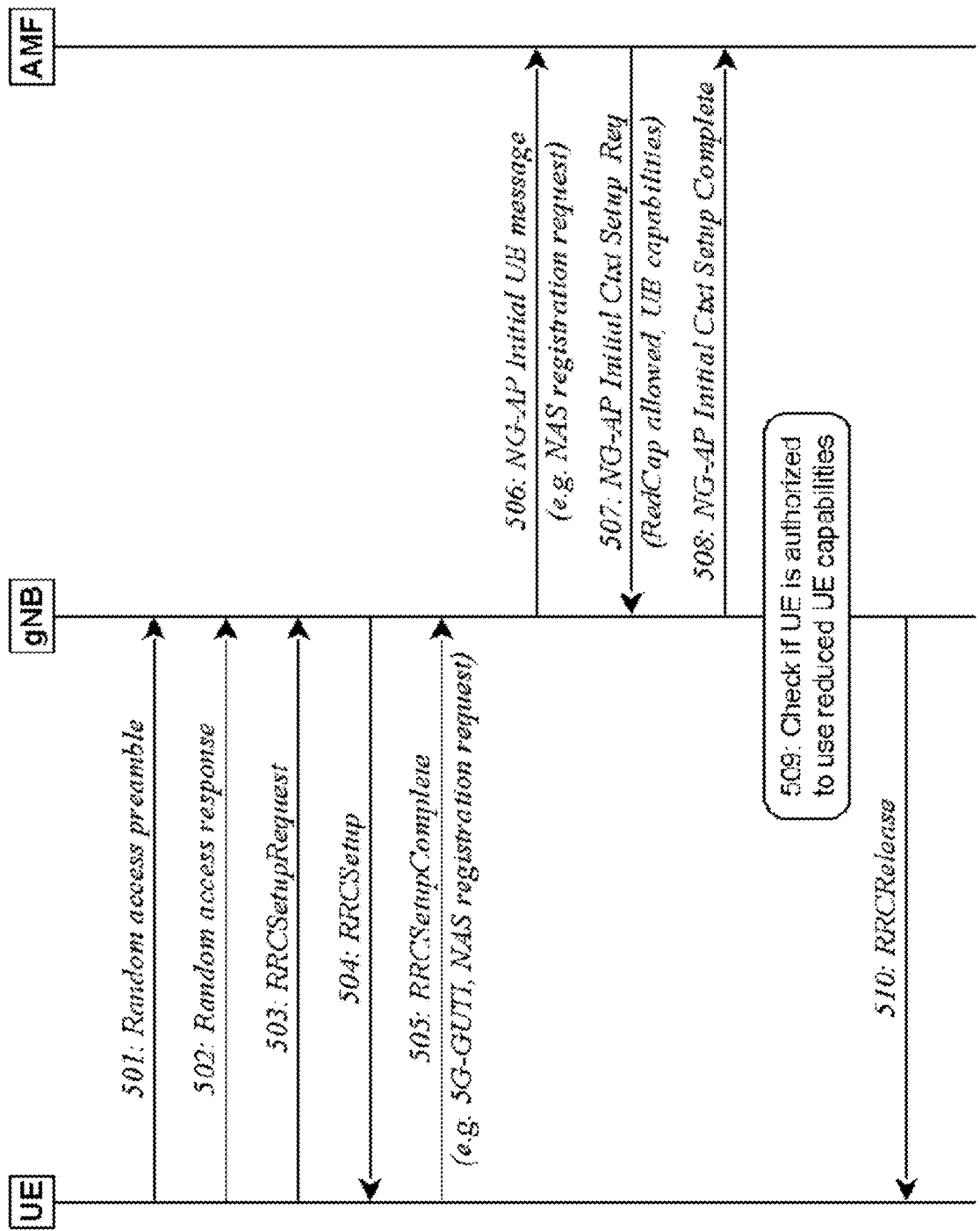
FIG. 5 is a sequence diagram depicting embodiments of a method.

Method actions according to this alternative 2 are illustrated in FIG. 5. In the example of FIG. 5 and its corresponding text below, the UE 120 is referred to as UE, the CN node 130 is represented by and referred to as AMF, and the RAN node 110 is referred to as gNB.

Actions 501-505. These actions e.g. relate to Actions 301 and 302 how the apparatus 110, 120, 130 such as the RAN node 110 e.g. the gNB, obtains an indication that the UE 120 intends to access the radio communications network 100 using reduced capabilities and information about the UE subscriber profile, as described above.

The UE 120 performs random access and establishes an RRC connection with the gNB to be able to exchange data or signaling with the network. The UE identity, e.g. Globally Unique Temporary UE Identity (GUTI), and the NAS message that triggered the RRC connection establishment such as a NAS registration request, are sent in the RRCSetupComplete message in the RRC connection establishment procedure.

The RAN node 110 may learn that the UE 120 is using reduced capabilities from either the RRC connection setup itself, e.g. the UE 120 includes an indication that it using reduced capabilities in the RRC setup request message, or when it receives the UE capabilities stored in the CN. The UE identity, e.g. GUTI, itself does not indicate whether the UE 120 is using reduced capabilities. The UE identity is used to retrieve information from the CN whether the UE 120 is allowed to use reduced capabilities though.

Thus, the UE identity will be used by the RAN node 110 to retrieve the UE context from the CN node 130, which includes the UE capabilities and subscriber profile. It should be noted that that it is possible that the CN node 130 only sends a subset of the subscriber profile to the RAN, such as the RAN node 110, or sends configuration data derived from the subscriber profile.

Action 506. This action relates to parts of Action 302 how the apparatus 110, 120, 130 such as the RAN node 110 e.g. the gNB, obtains information about the UE subscriber profile as described above.

The gNB, such as the RAN node 110, forwards the UE identity and initial NAS message received from the UE 120 during RRC connection establishment to the AMF e.g. in an NG-AP Initial UE message. This is for the RAN node 110 to obtain information about the UE subscriber profile by retrieving the information about the UE subscriber profile from the UE context which includes the UE capabilities and subscriber profile.

Actions 507-508. This action relates to parts of Action 302 how the apparatus 110, 120, 130 such as the RAN node 110 e.g. the gNB, obtains information about the UE subscriber profile as described above.

The AMF, such as the CN node 130, uses the UE identity to retrieve the UE context which includes the UE capabilities and subscriber profile, or information derived from the subscriber profile. The UE context is sent to the gNB in the NG-AP Initial Context Setup Request which responds with the NG-AP Initial Context Setup Complete.

Action 509. This action relates to Action 303 as described above, how the apparatus 110, 120, 130 such as the RAN node 110 e.g. the gNB, determines whether or not the UE 120 is authorized to access the radio communications network 100 by using reduced capabilities, based on the obtained information about the subscriber profile of the UE 120, as described above. The gNB, such as the RAN node 110, checks that the UE 120 is authorized to use reduced UE capabilities based on the UE context information received from the AMF. The check may e.g. be based on an explicit indication in the UE context, e.g. "RedCap allowed" or it may be done implicitly based on one of the existing parameters included in the UE context, for instance:

Allowed network(s), e.g. indicated by the PLMN ID,
Allowed network slice(s) e.g. indicated by the Allowed NSSAI.
QoS policy information for the data bearers to be established, e.g. each QoS flow in a PDU session has an associated QoS profile indicated by the QFI.
RRM policy information, e.g. indicated by the RFSP/SPID.

In a case when the implicit approach is used it may be assumed that a dedicated network, network slice, QoS profile, or RRM policy has been configured for a particular service, and any UE, such as the UE 120, which is assigned to that network, network slice, QoS profile or RRM policy is allowed to use reduced capabilities.

Note that the gNB, such as the RAN node 110, may determine that the UE is using reduced capabilities based on the UE capabilities in the UE context. Depending on if a new or the existing random access procedure is used for UEs with reduced capabilities, it may also be possible for the gNB to determine that the UE is using reduced UE capabilities already during the random access procedure. A third option is to indicate in e.g. the RRCSetupRequest or RRCSetupComplete message that the UE is using reduced capabilities.

Action 510. This action relates to Actions 304 and 305 as described above, how the apparatus 110, 120, 130 such as the RAN node 110 e.g. the gNB, accepts or rejects access to radio communications network using reduced capabilities.

If the authorization is successful the gNB, such as the RAN node 110, may proceed with e.g. bearer setup to be able to exchange data with the UE 120. Otherwise, if the authorization fails, the gNB, such as the RAN node 110, may release the RRC connection e.g. by sending an RRCRelease message with an appropriate cause value, and possibly an extended wait time to avoid frequent re-attempts. The gNB, such as the RAN node 110, may also redirect the UE 120 to another RAT and/or frequency and/or cell in the RRCRelease message. Another alternative is that the gNB, such as the RAN node 110, informs the AMF, such as the CN node 130, of the authorization failure so that the AMF, such as the CN node 130, may reject the UE 120 over NAS. For example, the AMF, such as the CN node 130, may perform a network initiated de-registration of the UE 120 and send a NAS De-registration Request to the UE where it includes an appropriate cause value.

In some cases, it may be possible for the gNB, such as the RAN node 110, to perform the authorization check without having to retrieve the UE context from the AMF, such as the CN node 130. For example, if the gNB, such as the RAN node 110, may determine that the UE 120 is using reduced UE capabilities already during random access or during the RRC connection setup, and the UE 120 requests access to a network or network slice during connection establishment for which reduced UE capabilities is not allowed. In this case the gNB, such as the RAN node 110, may reject the UE 120 directly without having to contact the AMF, such as the CN node 130.

In the description above it is assumed that the UE 120 is in RRC_IDLE state when the RRC connection is established with the gNB, such as the RAN node 110. The case when the UE 120 is in RRC_INACTIVE and resumes a previously suspended RRC connection may be handled in a similar way. The main difference is that the UE 120 performs RRC resume instead of RRC setup and the gNB, such as the RAN node 110, retrieves the UE context from the gNB, such as the RAN node 110, which suspended the RRC connection instead from the AMF, such as the CN node 130. The stored UE context is retrieved using the Inactive Radio Network Temporary Identifier (I-RNTI) included in the RRCResumeRequest and includes the authorization info (e.g. the "RedCap allowed" indication) and the UE capabilities.

Similar to the first alternative, one special case is when the UE performs an emergency call. In this case the gNB may choose to allow a UE with reduced capabilities to proceed with the emergency call even if the UE would normally not be allowed to use reduced capabilities.

Alternative 3: Authorization check performed in the UE 120.

In this alternative, the apparatus is the UE 120.

Figure 6:
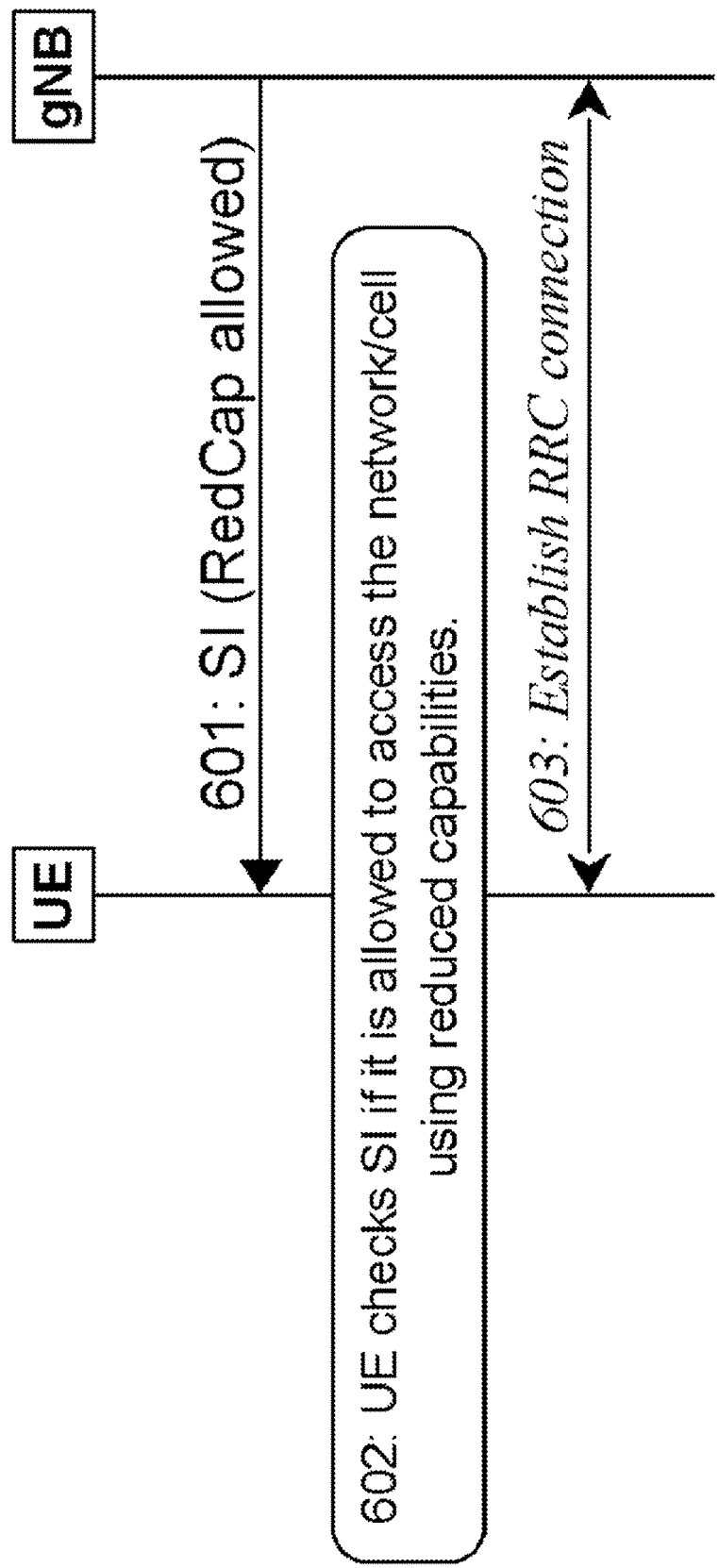
FIG. 6 is a sequence diagram depicting embodiments of a method.

In the example of FIG. 6 and its corresponding text below, the UE 120 is referred to as UE, the CN node 130 is represented by and referred to as AMF, and the RAN node 110 is referred to as gNB.

In order to prevent access attempts from reduced capability UEs such as the UE 120, also referred to as RedCap UEs, the gNB, such as the RAN node 110, may include an indication in System Information (SI) to indicate if access from RedCap UEs is allowed in the cell, See FIG. 6.

Action 601.

This action relates to Action 302 how the apparatus 110, 120, 130 such as the UE 120 obtains information about the UE subscriber profile as described above.

The UE 120 obtains information about the UE subscriber profile e.g. comprising an indication in System Information (SI). The SI indication indicates if the cell may be accessed by UEs, such as the UE 120, using reduced capabilities and is common for all UEs in the cell. The indication can thus be interpreted as being part of all UE's, such as the UE 120, subscriber profiles, i.e. instead of storing information of the cells that can be accessed with reduced capabilities in every UE's subscriber profile, the networks, such as the RAN node 110, broadcasts a common indication in the cell, e.g. the cell of the RAN node 110, which indicates whether the cell can be accessed by UEs, such as including the UE 120, with reduced capabilities.

Actions 602 and 603.

These actions relates to Action 303 as described above, how the apparatus 110, 120, 130 such as the UE 120 determines whether or not the UE 120 is authorized to access the radio communications network 100 by using reduced capabilities, based on the obtained information about the subscriber profile of the UE 120, as described above.

The UE 120 checks SI if it is authorized to access the radio communications network 100 with reduced capabilities. As explained in action 601, SI indication may be considered to be a common part of all UEs' subscriber profiles and indicates if the cell can be accessed by UEs, such as the UE 120, with reduced capabilities.

This is performed when the UE 120 accesses to the radio communications network 100 using reduced capabilities, covering also the wording "when the UE 120 intends to access to the radio communications network 100 using reduced capabilities".

For the gNB, such as the RAN node 110, this is beneficial since it would save a lot of signaling to reject UEs, such as the UE 120, in a later step. For UEs, such as the UE 120, it is beneficial for the same reasons, since random access and a connection establishment attempt will not be required just to find out that the UE 120 is not allowed to access with its lower UE capabilities. Such an indication in system information may either be explicit or implicit, e.g. based on the presence of a configuration in system information for a RedCap PRACH partition, any other RedCap configuration information, or any other RedCap related broadcast information such as the SSS-L Another alternative is to include an indication per network, identified by a PLMN ID, per slice, identified by a S-NSSAI, or per service, identified by a service identifier.

Figure 7:
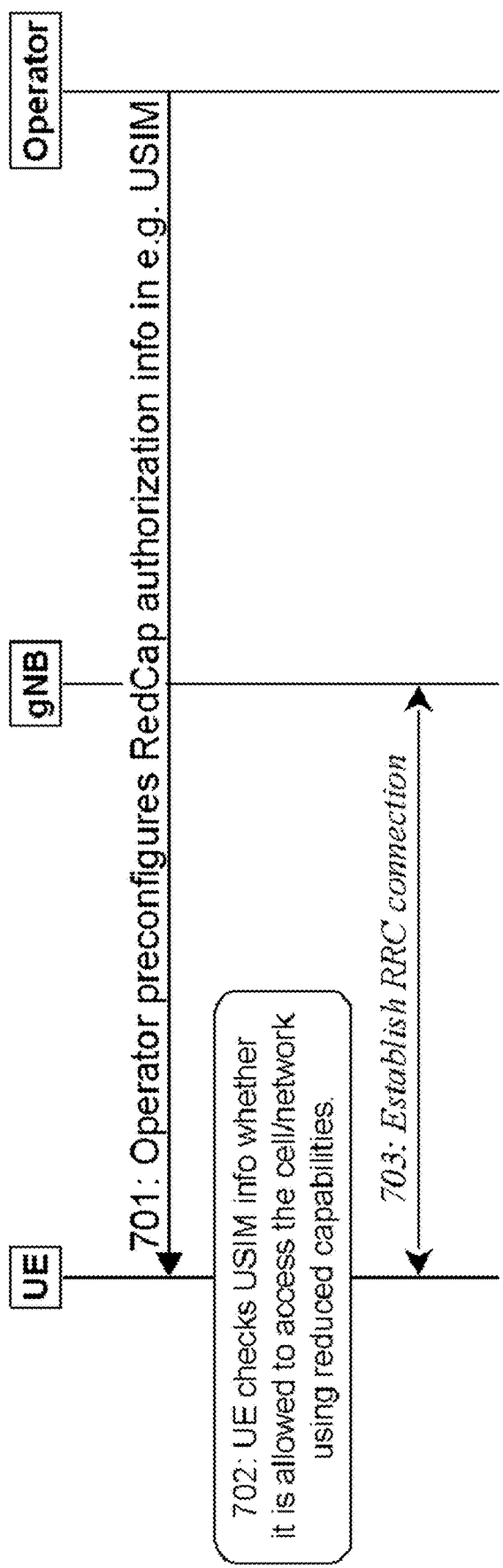
FIG. 7 is a sequence diagram depicting embodiments of a method.

Another option is depicted in FIG. 7. In FIG. 7 the UE 120 checks USIM if it is authorized to access a network using reduced capabilities.

In the example of FIG. 7 and its corresponding text below, the UE 120 is referred to as UE, the CN node 130 is represented by and referred to as Operator and the RAN node 110 is referred to as gNB. The operator is the entity who owns and/or manages the network or parts of the network such as the radio communications network 100.

Action 701-703.

This action relates to Action 302 how the apparatus 110, 120, 130 such as the UE 120 obtains information about the UE subscriber profile as described above and Action 303 as described above, how the apparatus 110, 120, 130 such as the UE 120 determines whether or not the UE 120 is authorized to access the radio communications network 100 by using reduced capabilities, based on the obtained information about the subscriber profile of the UE 120, as described above.

The UE 120 obtains information about the UE subscriber profile e.g. comprising USIM information.

For the operator to control network access such as accesses to the radio communications network right is to pre-configure UEs, such as the UE 120, with authorization information defining if access for a certain UE type is permitted in a certain network according to its subscriber profile. The pre-configured information may e.g. be stored in the UE 120, or in the USIM of the UE 120. It may be defined per network, identified by a PLMN ID, or per access technology, or per a combination of the two. Furthermore, the access information may indicate the minimum level of UE capabilities required to be authorized to perform access in a network using a certain access technology. In one example a UE, such as the UE 120, supports NB-IoT UE category NB1 and an NR MTC UE category, supporting a reduced set of capabilities. The UE is pre-configured with a USIM including a list indicating that the UE may:

Access PLMN X using NB-IoT access technology

Not access PLMN X using NR with a reduced set of NR UE capabilities.

Access PLMN Y using both NB-IoT access technology, and NR regardless of its NR UE capabilities.

The preconfigured information may be updated, or overridden, based on network, such as the RAN node 110, signaling.

Note that in case the UE 120 performs the authorization check as in the options above, the preceding alternatives would still be of interest to have a network mechanism in place to check that UEs, such as the UE 120, follow the indication in SI or USIM and do not attempt to cheat.

If the UE 120 is not allowed to access a network, in either of the above alternatives, the UE may still be allowed to access the network for emergency calls (i.e. so called "limited service state"). During cell selection and cell reselection the UE 120 may first search for cells providing normal service and if no such cell is found it will start to search for cells providing limited service.

Figure 8A:
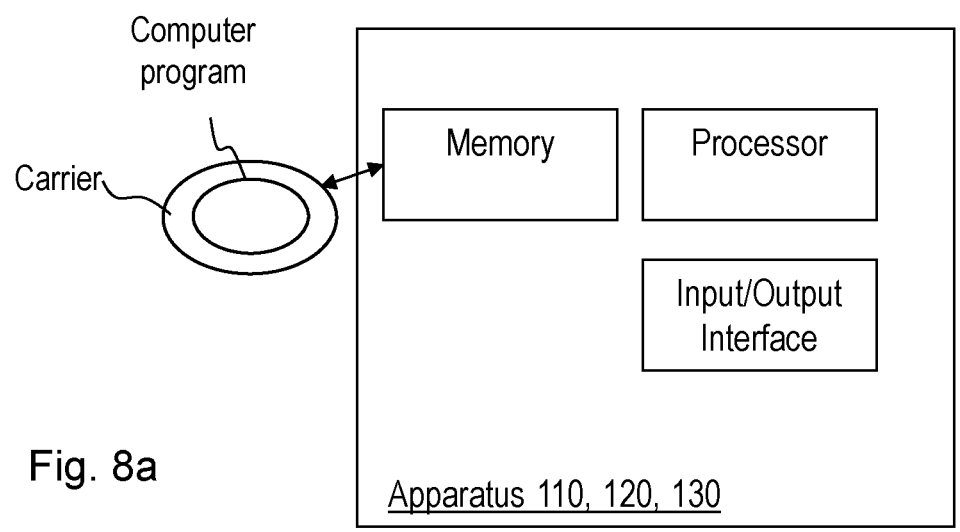
FIGS. 8 a and b are schematic block diagrams illustrating embodiments of an apparatus.
Figure 8B:
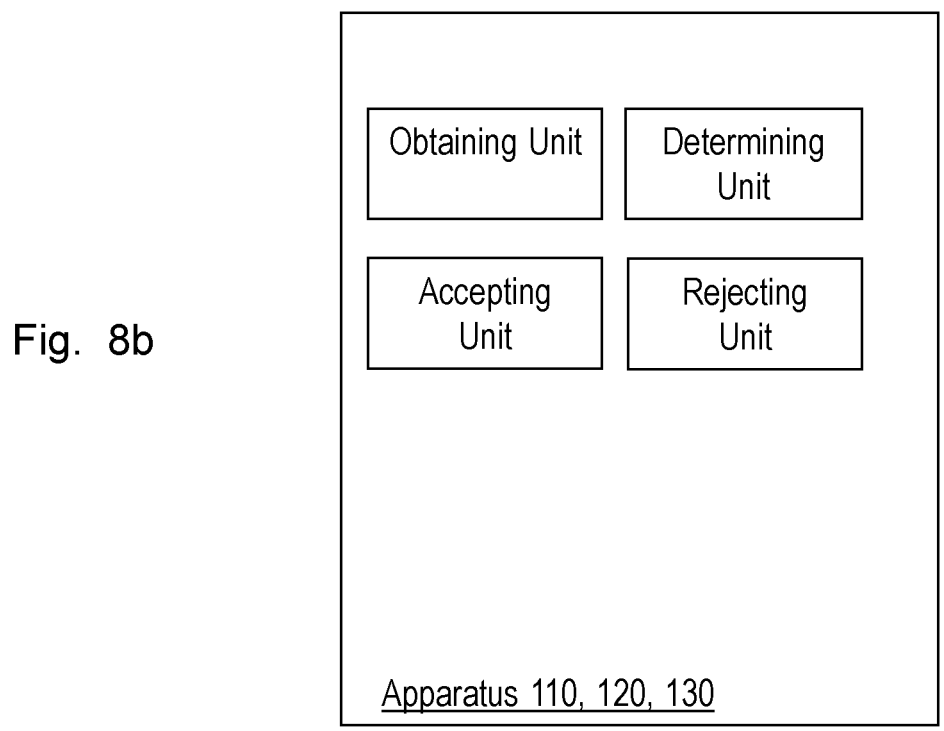

FIGS. 8*a* and 8*b* shows an example of an arrangement in the apparatus 110, 120, 130. The apparatus 110, 120, 130 is adapted to be any one or more out of: the UE 120, the RAN, node 110 and the CN, node 130 in the radio communications network.

The RAN node 110 may comprise an input and output interface configured to communicate with each other, see FIG. 8*a*. The input and output interface may comprise a wireless receiver (not shown) and a wireless transmitter (not shown).

The apparatus 110, 120, 130 may comprise an obtaining unit, a determining unit, an accepting unit, and a rejecting unit to perform the method actions as described herein, see FIG. 8*b*.

The embodiments herein may be implemented through a respective processor or one or more processors, such as the processor of a processing circuitry in the apparatus 110, 120, 130 depicted in FIG. 8*a*, together with computer program code for performing the functions and actions of the embodiments herein. The program code mentioned above may also be provided as a computer program product, for instance in the form of a data carrier carrying computer program code for performing the embodiments herein when being loaded into the apparatus 110, 120, 130. One such carrier may be in the form of a CD ROM disc. It is however feasible with other data carriers such as a memory stick. The computer program code may furthermore be provided as pure program code on a server and downloaded to the apparatus 110, 120, 130.

The apparatus 110, 120, 130 may further comprise respective a memory comprising one or more memory units. The memory comprises instructions executable by the processor in the apparatus 110, 120, 130.

The memory is arranged to be used to store information about UE subscriber profiles, instructions, data, configurations, and applications to perform the methods herein when being executed in the apparatus 110, 120, 130.

In some embodiments, a computer program comprises instructions, which when executed by the at least one processor, cause the at least one processor of the apparatus 110, 120, 130 to perform the actions above.

In some embodiments, a respective carrier comprises the respective computer program, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the functional modules in the apparatus 110, 120, 130, described below may refer to a combination of analog and digital circuits, and/or one or more processors configured with software and/or firmware, e.g. stored in the apparatus 110, 120, 130, that when executed by the respective one or more processors such as the processors described above cause the respective at least one processor to perform actions according to any of the actions above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used.

Below, some example embodiments 1-16 are shortly described. See e.g. FIGS. 2, 3, 8*a*, and 8*b*.

Embodiment 1. A method e.g. for handling a User Equipment, UE, 120 access to a radio communications network 100, which UE 120 is using reduced capabilities, which reduced capabilities relate to reduced capabilities for communication in the radio communications network 100, the method comprising any one or more out of:

obtaining 302 information about a subscriber profile of the UE 120, when the UE 120 accesses to the radio communications network 100 using reduced capabilities, determining 303 whether or not the UE 120 is authorized to access the radio communications network 100 by using reduced capabilities, based on the obtained information about the subscriber profile of the UE 120.

Embodiment 2. The method according to embodiment 1, further comprising:

when determining that the UE 120 is authorized to access the radio communications network 100 by using reduced capabilities, accepting 304 the access the radio communications network 100 by using reduced capabilities, and when determining that the UE 120 is not authorized to access the radio communications network 100 by using reduced capabilities, rejecting 305 access to the radio communications network 100 by using reduced capabilities.

Embodiment 3. The method according to any of the embodiments 1-2, wherein the information about a subscriber profile of the UE 120 comprises information that the UE 120 is authorized to use reduced capabilities when accessing to one or more specific parts of the radio communications network 100. E.g. a dedicated network, network slice.

Embodiment 4. The method according to any of the embodiments 1-3, wherein the information about a subscriber profile of the UE 120 comprises information that the UE 120 is authorized to use reduced capabilities when accessing the radio communications network 100 using one or more specific policies. E.g. a QoS profile, or RRM policy being configured for a particular service.

Embodiment 5. The method according to any of the embodiments 1-4, wherein the reduced capabilities comprises one or more out of:

Reduced UE bandwidth,
Reduced number of UE Receiving, RX, and/or Transmitting, TX, antennas,
Half duplex Frequency Division Duplex, FDD,
Relaxed UE processing time, and
Relaxed UE processing capability.

Embodiment 6. The method according to any of the embodiments 1-5, further comprising:
obtaining 301 an indication that the UE 120 intend to access the radio communications network 100 using reduced capabilities.

Embodiment 7. The method according to any of the embodiments 1-6, wherein the method is performed by any one or more out of: the UE 120, a Radio Access Network, RAN, node 110 and a Core Network, CN, node 130, in the radio communications network 100.

Embodiment 8. A computer program comprising instructions, which when executed by a processor, causes the processor to perform actions according to any of the embodiments 1-7.

Embodiment 9. A carrier comprising the computer program of embodiment 8, wherein the carrier is one of an electronic signal, an optical signal, an electromagnetic signal, a magnetic signal, an electric signal, a radio signal, a microwave signal, or a computer-readable storage medium.

Embodiment 10. An apparatus 110, 120, 130 in a radio communications network 100 e.g. configured to handle a User Equipment, UE, 120 access to a radio communications network 100, which UE 120 is configured to use reduced capabilities, and which reduced capabilities are adapted to relate to reduced capabilities for communication in the radio communications network 100, and which apparatus further is configured to any one or more out of:
obtain information about a subscriber profile of the UE 120, e.g. by means of an obtaining unit in the apparatus 110, 120, 130,
when the UE 120 accesses to the radio communications network 100 using reduced capabilities, determine whether or not the UE 120 is authorized to access the radio communications network 100 by using reduced capabilities, based on the obtained information about the subscriber profile of the UE 120, e.g. by means of a determining unit in the apparatus 110, 120, 130.

Embodiment 11. The apparatus 110, 120, 130 according to embodiment 10, further being configured to:
when determining that the UE 120 is authorized to access the radio communications network 100 by using reduced capabilities, accept the access to the radio communications network 100 by using reduced capabilities e.g. by means of an accepting unit in the apparatus 110, 120, 130,
when determining that the UE 120 is not authorized to access the radio communications network 100 by using reduced capabilities, reject access to the radio communications network 100 by using reduced capabilities, e.g. by means of a rejecting unit in the apparatus 110, 120, 130.

Embodiment 12. The apparatus 110, 120, 130 according to any of the embodiments 10-11, wherein the information about a subscriber profile of the UE 120 is adapted to comprise information that the UE 120 is authorized to use reduced capabilities when accessing to one or more specific parts of the radio communications network 100. E.g. a dedicated network, network slice.

Embodiment 13. The apparatus 110, 120, 130 according to any of the embodiments 10-12, wherein the information about a subscriber profile of the UE 120 further is adapted to comprise information that the UE 120 is authorized to use reduced capabilities when accessing the radio communications network 100 using one or more specific policies. E.g. a QoS profile, or RRM policy being configured for a particular service.

Embodiment 14. The apparatus 110, 120, 130 according to any of the embodiments 10-13, wherein the reduced capabilities is adapted to comprise one or more out of:
Reduced UE bandwidth,
Reduced number of UE Receiving, RX, and/or Transmitting, TX, antennas,
Half duplex Frequency Division Duplex, FDD,
Relaxed UE processing time, and
Relaxed UE processing capability.

Embodiment 15. The apparatus 110, 120, 130 according to any of the embodiments 10-14, further being configured to:
obtain an indication that the UE 120 intend to access the radio communications network 100 using reduced capabilities e.g. by means of an obtaining unit in the apparatus 110, 120, 130.

Embodiment 16. The apparatus 110, 120, 130 according to any of the embodiments 10-15, wherein the apparatus 110, 120, 130 is adapted to be any one or more out of: the UE 120, a Radio Access Network, RAN, node 110 and a Core Network, CN, node 130, in the radio communications network 100.

Further Extensions and Variations

Figure 9:
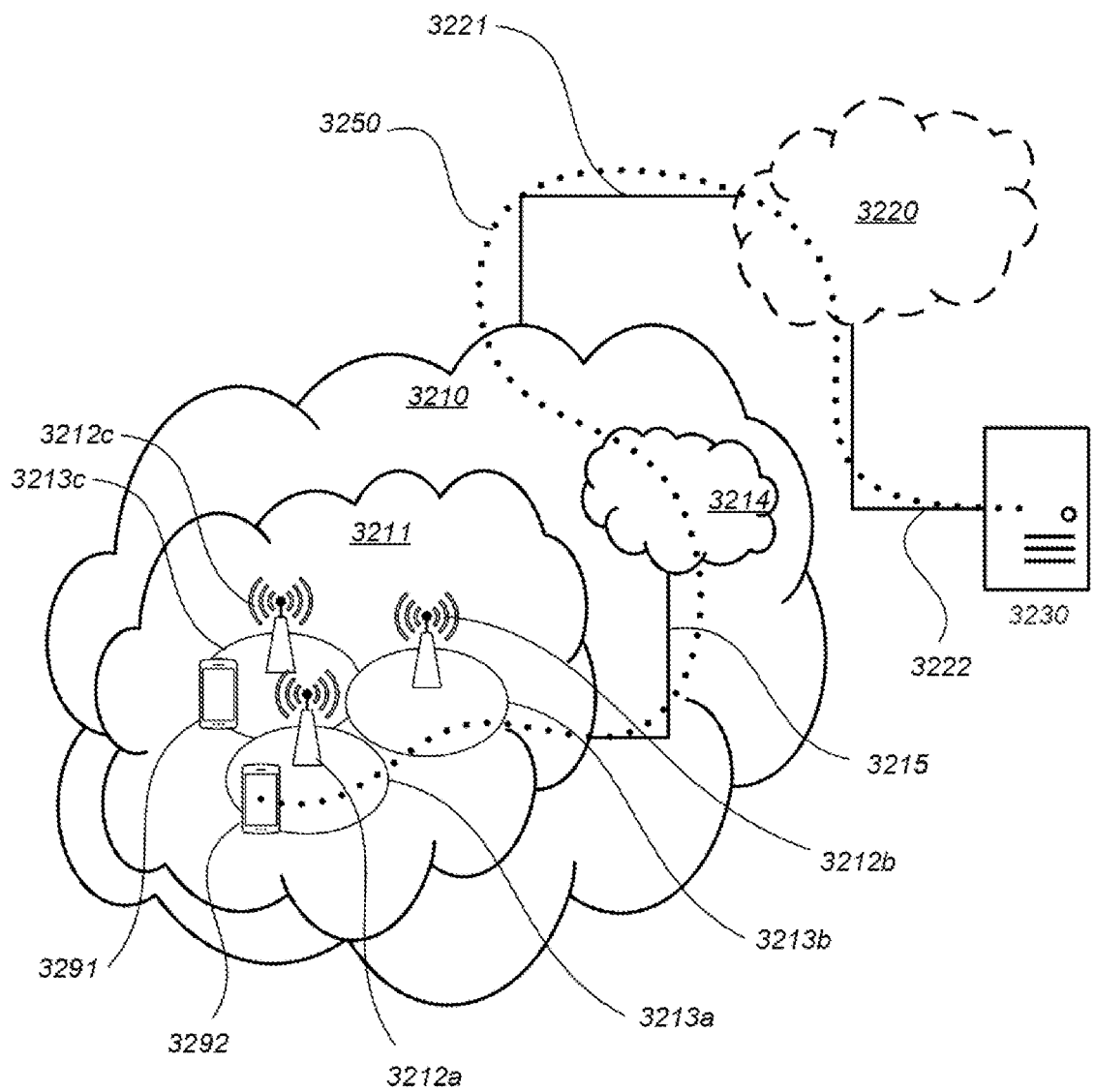
FIG. 9 schematically illustrates a telecommunication network connected via an intermediate network to a host computer.

With reference to FIG. 9, in accordance with an embodiment, a communication system includes a telecommunication network 3210 such as the radio communications network 100, e.g. an IoT network, or a WLAN, such as a 3GPP-type cellular network, which comprises an access network 3211, such as a radio access network, and a core network 3214. The access network 3211 comprises a plurality of base stations 3212a, 3212b, 3212c, such as the RAN node 110, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the UE 120 such as a Non-AP STA 3291 located in coverage area 3213c is configured to wirelessly connect to, or be paged by, the corresponding base station 3212c. A second UE 3292 e.g. the wireless device 122 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

Figure 10:
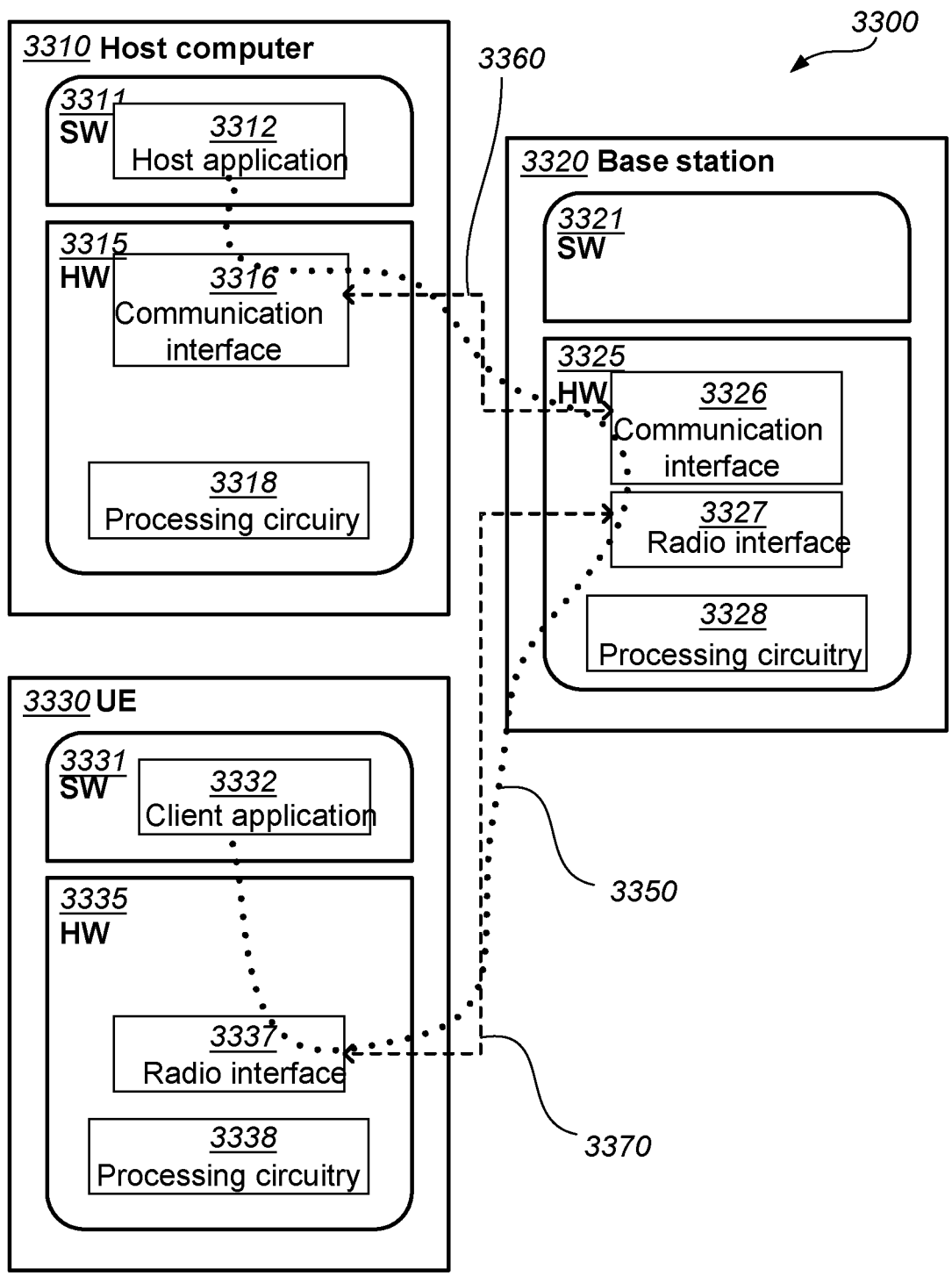
FIG. 10 is a generalized block diagram of a host computer communicating via a base station with a user equipment over a partially wireless connection.

The communication system of FIG. 10 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 10. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown) served by the base station 3320. The communication interface 3326 may be configured to facilitate a connection 3360 to the host computer 3310. The connection 3360 may be direct or it may pass through a core network (not shown in FIG. 10) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

It is noted that the host computer 3310, base station 3320 and UE 3330 illustrated in FIG. 10 may be identical to the host computer 3230, one of the base stations 3212a, 3212b, 3212c and one of the UEs 3291, 3292 of FIG. 11, respectively. This is to say, the inner workings of these entities may be as shown in FIG. 10 and independently, the surrounding network topology may be that of FIG. 9.

In FIG. 10, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the applicable RAN effect: data rate, latency, power consumption, and thereby provide benefits such as corresponding effect on the OTT service: e.g. reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 11 is a flowchart illustrating a method implemented in a communication system, in accordance with one embodiment. The communication system includes a host computer, a base station such as the network node 110, and a UE such as the UE 120, which may be those described with reference to FIG. 9 and FIG. 10. For simplicity of the present disclosure, only drawing references to FIG. 11 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 12 is a flowchart illustrating a method implemented in a communication system, in accordance with one embodiment. The communication system includes a host computer, a base station such as a AP STA, and a UE such as a Non-AP STA which may be those described with reference to FIG. 9 and FIG. 10. For simplicity of the present disclosure, only drawing references to FIG. 12 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

Figure 13:
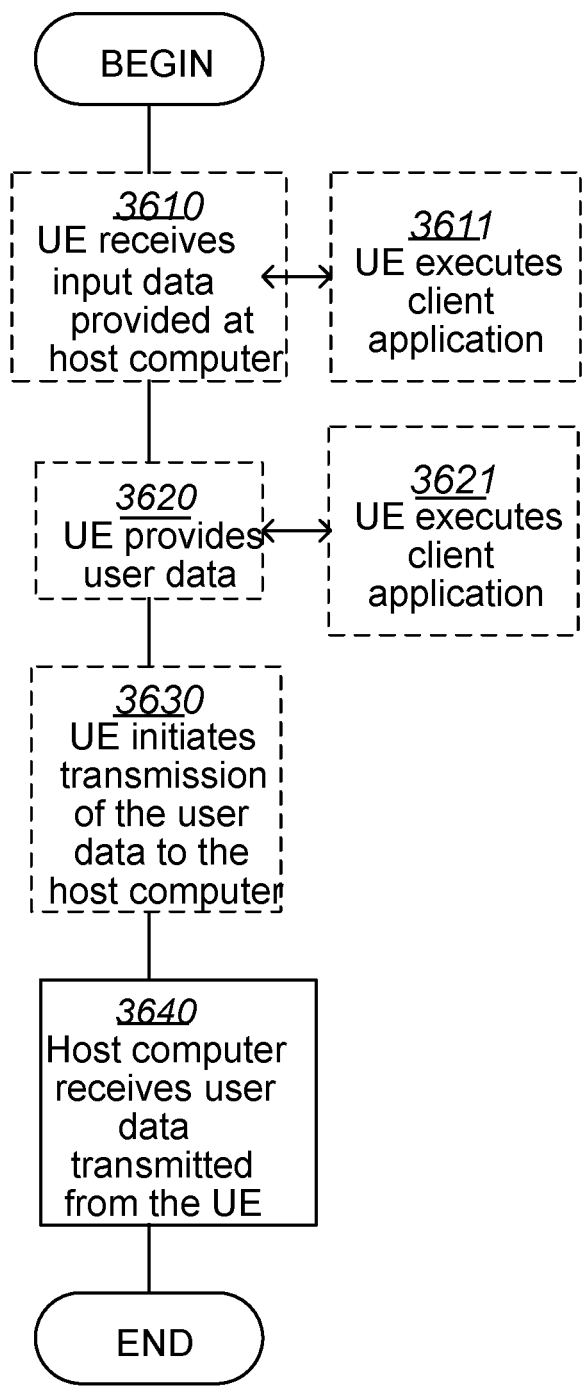

FIG. 13 is a flowchart illustrating a method implemented in a communication system, in accordance with one embodiment. The communication system includes a host computer, a base station such as a AP STA, and a UE such as a Non-AP STA which may be those described with reference to FIG. 9 and FIG. 10. For simplicity of the present disclosure, only drawing references to FIG. 13 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

Figure 14:
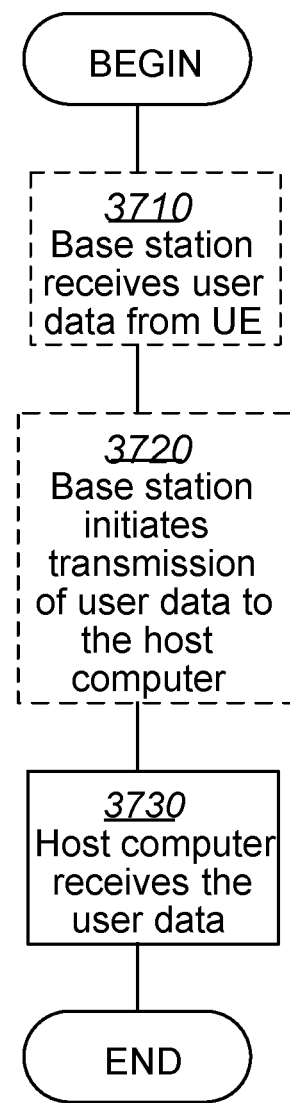

FIG. 14 is a flowchart illustrating a method implemented in a communication system, in accordance with one embodiment. The communication system includes a host computer, a base station such as a AP STA, and a UE such as a Non-AP STA which may be those described with reference to FIG. 9 and FIG. 10. For simplicity of the present disclosure, only drawing references to FIG. 14 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

| Abbreviation | Explanation |
| --- | --- |
| 3GPP | 3rd Generation Partnership Project |
| 4G | 4th Generation |
| 5G | 5th Generation |
| 5GC | 5G Core |
| 5GS | 5G System |
| AMF | Access and Mobility management Function |
| CN | Core Network |
| CU | Central Unit |
| DU | Distributed Unit |
| eNB | Evolved Node B (A radio base station in LTE.) |
| E-UTRAN | Evolved Universal Terrestrial Radio Access Network |
| gNB | 5G Node B (A radio base station in NR.) |
| LTE | Long Term Evolution |
| NG | The interface/reference point between the RAN and the CN in 5G/NR. |
| NG-C | The control plane part of NG (between a gNB and an AMF). |
| NG-RAN | Next Generation Radio Access Network |
| NG-U | The user plane part of NG (between a gNB and a UPF). |
| NR | New Radio |
| NSSAI | Network Slice Selection Assistance Information |
| OFDM | Orthogonal Frequency Division Multiplex |
| PLMN | Public Land Mobile Network |
| RAN | Radio Access Network |
| RLC | Radio Link Control |
| RRC | Radio Resource Control |
| RFSP Index | RAT/Frequency Selection Priority Index |
| S-NSSAI | Selected NSSAI |
| SN | Sequence Number |
| SPID | Subscriber Profile ID for RAT/Frequency Priority |
| TA | Tracking Area |
| TS | Technical Specification |
| UDM | Unified Data Management |
| UE | User Equipment |
| UPF | User Plane Function |

-continued

| Abbreviation | Explanation |
|---|---|
| URLLC | Ultra-Reliable Low-Latency Communication |
| USIM | Universal Subscriber Identity Module |
| Xn | The interface/reference point between two gNBs. |

The invention claimed is:

1. A method performed by an apparatus for handling a User Equipment, UE, access to a radio communications network, which UE is using reduced capabilities, and which reduced capabilities relate to reduced capabilities for communication in the radio communications network, the method comprising:
obtaining information about a subscriber profile of the UE,
when the UE accesses to the radio communications network using reduced capabilities, determining whether or not the UE is authorized to access the radio communications network by using reduced capabilities, based on the obtained information about the subscriber profile of the UE, wherein the information about the subscriber profile of the UE comprises information that the UE is authorized to use reduced capabilities when accessing to one or more specific parts of the radio communications network,
wherein the method is performed by the apparatus comprising any one or more out of: a Radio Access Network, RAN, node and a Core Network, CN, node, in the radio communications network.

2. The method according to claim 1, further comprising:
when determining that the UE is authorized to access the radio communications network by using reduced capabilities, accepting the access to the radio communications network by using reduced capabilities;
when determining that the UE is not authorized to access the radio communications network by using reduced capabilities, rejecting access to the radio communications network by using reduced capabilities.

3. The method according to claim 1, wherein the information about the subscriber profile of the UE comprises information that the UE is authorized to use reduced capabilities when accessing the radio communications network using one or more specific policies.

4. The method according to claim 1, wherein the reduced capabilities comprise one or more out of:
Reduced UE bandwidth,
Reduced number of UE Receiving, RX, and/or Transmitting, TX, antennas,
Half duplex Frequency Division Duplex, FDD,
Relaxed UE processing time, and
Relaxed UE processing capability.

5. The method according to claim 1, further comprising: obtaining an indication that the UE intends to access the radio communications network using reduced capabilities.

6. An apparatus in a radio communications network configured to handle a User Equipment, UE, access to a radio communications network, which UE is configured to use reduced capabilities, which reduced capabilities are adapted to relate to reduced capabilities for communication in the radio communications network, and which apparatus further is configured to:
obtain information about a subscriber profile of the UE,
when the UE accesses to the radio communications network using reduced capabilities, determine whether or not the UE is authorized to access the radio communications network by using reduced capabilities, based on the obtained information about the subscriber profile of the UE, wherein the information about the subscriber profile of the UE is adapted to comprise information that the UE is authorized to use reduced capabilities when accessing to one or more specific parts of the radio communications network,
wherein the apparatus is adapted to be any one or more out of: a Radio Access Network, RAN, node and a Core Network, CN, node, in the radio communications network.

7. The apparatus according to claim 6, further being configured to:
when determining that the UE is authorized to access the radio communications network by using reduced capabilities, accept the access to the radio communications network by using reduced capabilities,
when determining that the UE is not authorized to access the radio communications network by using reduced capabilities, reject access to the radio communications network by using reduced capabilities.

8. The apparatus according to claim 6, wherein the information about the subscriber profile of the UE further is adapted to comprise information that the UE is authorized to use reduced capabilities when accessing the radio communications network using one or more specific policies.

9. The apparatus according to claim 6, wherein the reduced capabilities are adapted to comprise one or more out of:
Reduced UE bandwidth,
Reduced number of UE Receiving, RX, and/or Transmitting, TX, antennas,
Half duplex Frequency Division Duplex, FDD,
Relaxed UE processing time, and
Relaxed UE processing capability.

10. The apparatus according to claim 6, further being configured to:
obtain an indication that the UE intends to access the radio communications network using reduced capabilities.

\* \* \* \* \*